US006272852B1

(12) United States Patent
Stangroom

(10) Patent No.: US 6,272,852 B1
(45) Date of Patent: Aug. 14, 2001

(54) HIGH SPEED ACTUATORS AND VIBRATORS BASED ON ELECTRO-RHEOLOGICAL FLUIDS

(75) Inventor: James Edward Stangroom, Sheffield (GB)

(73) Assignee: ER Fluid Developments Limited (GB)

( * ) Notice: Subject to any disclaimer, the term of this patent is extended or adjusted under 35 U.S.C. 154(b) by 0 days.

(21) Appl. No.: 09/202,630

(22) PCT Filed: Jun. 20, 1997

(86) PCT No.: PCT/GB97/01679

§ 371 Date: Dec. 17, 1998

§ 102(e) Date: Dec. 17, 1998

(87) PCT Pub. No.: WO97/49924

PCT Pub. Date: Dec. 31, 1997

(30) Foreign Application Priority Data

Jun. 25, 1996 (GB) .................................................. 9613239

(51) Int. Cl.[7] ...................................................... F16D 37/00

(52) U.S. Cl. .............................. 60/326; 91/47; 91/417 R; 91/416

(58) Field of Search ................................ 60/326; 91/459, 91/275, 47, 417, 417 R, 416, 520, 464, 431; 92/242, 163

(56) References Cited

U.S. PATENT DOCUMENTS 3,599,428 * 8/1971 Chaney et al. ....................... 60/52 R
4,840,112 6/1989 Bhadra .
5,269,811 12/1993 Hayes et al. .
5,275,014 * 1/1994 Solomon ............................. 62/324.1

FOREIGN PATENT DOCUMENTS 2053421 2/1981 (GB) .
2120806 12/1983 (GB) .

OTHER PUBLICATIONS

"Electro–Rheological Valves in an Hydraulic Circuit" by A J Simmonds Ph. D, CEng, MIEE, Power International, May 1992.

* cited by examiner

*Primary Examiner*—Edward K. Look
*Assistant Examiner*—Thomas E. Lazo
(74) *Attorney, Agent, or Firm*—Trexler, Bushnell, Giangiorgi, Blackstone & Marr, Ltd.

(57) ABSTRACT

A pressure-operated linear actuator in which the working liquid is Electro-Rheological (ER) fluid in which there is a single flow path between an inlet and an outlet of an associated pump in which there are two or more pistons and fluid chambers delineated by these pistons, which fluid chambers are connected in series by stationary ER valves distinct from the pistons such that the pressure as determined by each of the ER valves is applied to one or more of the chamber(s), wherein one or both of the ER valves are divided into two or more sections in order to minimize the length, and maximize the cross-sectional area, of the inactive connecting passages.

6 Claims, 6 Drawing Sheets

HIGH SPEED ACTUATORS AND VIBRATORS BASED ON ELECTRO-RHEOLOGICAL FLUIDS

BACKGROUND

This invention is concerned with pressure-operated linear actuators in which the working liquid is an Electro-Rheological (ER) fluid.

Electro-rheological (ER) fluids are slurries of finely-divided solids in base liquids. Their flow behaviour is normally approximately Newtonian, like that of pure liquids, but exposure to an electric field evokes a large increase in flow resistance; this change is progressive (i.e. the greater the field, the greater the increase in flow resistance), reversible and occurs virtually instantaneously.

If an ER fluid is pumped through an array of insulated fixed plates with an electric field between them, the pressure drop across the assembly increases with the field; the system behaves like a servo-valve and is described as an "ER Valve". ER valves can take many forms:—they can be made up of flat plates, or concentric tubes and rods inside tubes. Having no moving parts, ER valves are cheap to make and their speed of response is very much faster than a conventional electromagnetic servo-valve. On the other hand, the electrical power supply to ER valves must be at high voltage, typically 2–4 kV, depending on the gap between the electrodes. The cost of high voltage units increases very sharply with the power required, and if their current output exceeds about 10 mA, they are potentially lethal. It is therefore important to minimise the power requirement of ER valves in any given application.

A complete, functional actuator system will include several items in addition to the ER fluid and the actuator. A pump will be required to generate the flow and pressure required to operate the device. A source of electrical power at high voltage will be required to energise the ER valve and this will need a control system to generate the command signals, and, in the case of a vibrator, to prevent the actuator "drifting" to one end of its permitted travel. All these are already available, or can be derived fairly simply from corresponding elements in conventional technology. They form no part of the present Patent, which is concerned solely with the actuator device itself.

Actuators combining ER Valves with piston assemblies similar to those used in conventional hydraulics are well known. Equations are available which adequately describe the pressure and flow of a known ER fluid through an ER valve. By combining these with the calculation techniques developed for conventional hydraulic devices it is possible to specify such actuators in terms of the properties of the ER fluid, the supply pressure, the piston area and the length, width and gap of the ER valve so that the peak power output occurs at any desired thrust and stroking speed. These calculations must also include the electrical control power required, since the high voltage source is usually the most costly single component in the system. The conventional optimisation methods must be slightly modified to minimise the control power required to achieve the desired performance. These methods and the practical results thereof are well known to those skilled in the art and form no part of the present Patent. However, in actuators designed for fast response, an additional parameter must be included in the calculations. This invention is concerned with constructional modifications imposed by this additional parameter and by the nature of ER fluids themselves.

In electro-magnetic servo-valves, the maximum bandwidth of 100–150 Hz is achieved by making the moving parts small and light and minimising their travel. The resultant restriction of the flow path through an "open" valve limits the maximum piston speed. By contrast, an ER valve has no moving parts and the flow path is limited only by the space and the electrical control power available, the latter being determined by the gap between the electrodes and their area. The ratio of the length of the electrode plates to the gap between them is fixed by the required maximum operating pressure; their width, and the gap between them determine the no-field flow resistance which can therefore be reduced as far as desired, but at the cost of increasing the electrical control power. This feature, combined with the very fast response of suitable ER fluids to changes in the electric field, which has a band-width of about 1 kHz, make it possible for ER actuators and vibrators to work at much higher frequencies and piston speeds than conventional systems, but aspects which can usually be neglected in conventional hydraulic systems become so important at high frequencies that they determine the basic design.

"Referred Inertia", i.e. the anomalously high inertial effects of small amounts of fluid in long, narrow pipes. is well known in conventional hydraulics, but it is seldom important in actuators. These usually work at relatively high pressures and are therefore fairly small and compact and as already discussed, their high frequency performance is limited by other considerations. The pressure capability of an ER valve, which is equivalent to a pipe, is directly proportional to its length, so long "pipe" runs are unavoidable. Furthermore, the specific gravity of a typical ER fluid (1.4) is much greater than that of a hydrocarbon oil (0.8–0.9). Detailed calculations show that referred inertia becomes the dominant term at high frequencies and amplitudes, so high frequency ER actuators must be designed to minimise this. In practice, since the size and shaped of the ER valves are fixed by other considerations, this means that the interconnecting pipes must be as short and wide as possible.

A second important design requirement arises from the fact that ER fluids are suspensions of fine particles in a base liquid. Although the solid and liquid in modem ER fluids are selected to have the same density, this "density matching" can only be exact at one temperature, so some settling-out is unavoidable. The practical disadvantages of this can be minimised by designing the actuator so that, as far as possible, the flow is uni-directional in every part; if "tidal flow" is allowed to occur at any point, for example into and out of a piston and cylinder assembly, a small mis-match in density between liquid and solid will eventually lead to the latter accumulating in the closed end. If there is a "through flow", on the other hand, any accumulated solid is swept out and re-dispersed.

SUMMARY

This invention reveals basic designs of ER actuator which minimise referred inertia and deposition of solid and allow compact and robust units to be constructed using readily available materials, components and techniques. As demonstrated in the Examples, these basic-designs can take many forms, and include other features which overcome common practical problems in ER devices.

DESCRIPTION

Figure 1A:
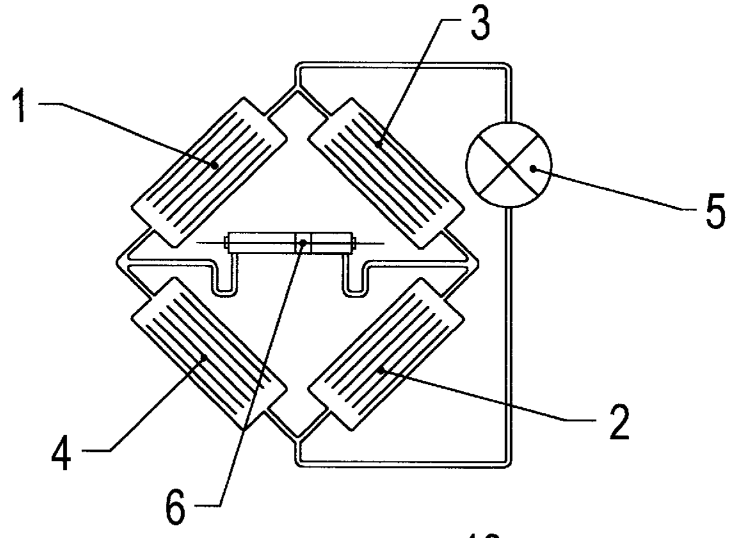
Prior Art FIG. 1A
FIG. 1A shows a Wheatstone bridge.

FIG. 1 shows the basic layout of three forms of ER actuator. FIG. 1A shows the "Four-Arm" or Wheatstone bridge, the form most commonly proposed. In this, there are four identical ER valves, (1), (2), (3) and (4), connected in two parallel flow paths between the inlet and outlet of the pump (5). A double-acting piston assembly (6) is connected between the mid-points of each flow path, and the ER valves which are diagonally opposite each other are electrically wired in parallel so that they are energised together. The piston is driven in one direction by energising one pair of ER valves and in the opposite direction by energising the second pair. Hayes et al (U.S. Pat. No. 5,269,811) describe a form of this system in which the pressurised ER fluid is used to propel a secondary fluid through a flexible diaphragm. Unlike their conventional counterparts, ER valves are usually quite large, so using two of them to drive the piston in each direction makes this actuator rather bulky; furthermore, the extra electrode area increases the electrical control power.

Figure 1B:
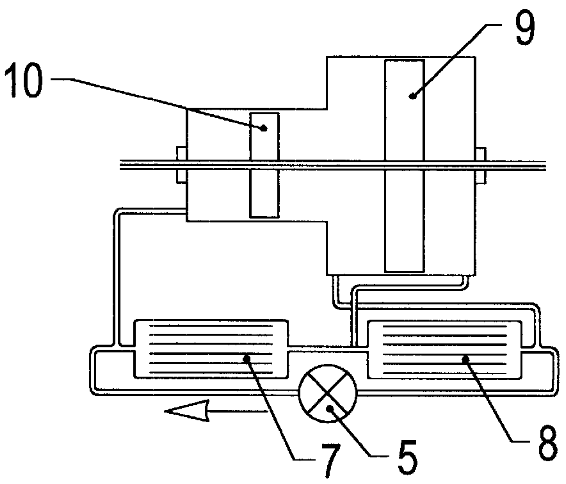
Prior Art FIG. 1B
FIG. 1B shows a prior art design wherein there are only two ER valves.

Stangroom (GB 2120806) describes the ER actuator, shown in FIG. 1B; and other authors have proposed variants. As shown, there are two chambers, each containing a set of concentric tubes forming an ER valve. These tubes are attached to a common rod, and move with it, so that they form a solid piston when a high voltage is applied to alternate tubes, but permit the ER fluid to flow freely when they are not energised. ER fluid from the pump is arranged to flow through the chambers in opposite directions, so that the rod can be driven in either direction by energising the appropriate ER valve. This form of ER actuator is simple and compact, and provides uni-directional flow at every point, but it is difficult to attach the tubes forming the ER valves sufficiently firmly to the common rods to resist the inertia forces without restricting the flow unduly. Another difficulty is that the inertia of the moving ER valves is normally greater than the referred inertia of the ER fluid in stationary ER valves.

The difficulties of the four-arm bridge are overcome by the design shown in FIG. 1B, in which there are only two ER valves, (7) and (8), in series between the inlet and outlet of the pump (5). This is connected to a composite cylinder which is divided into three chambers by two pistons linked together, one of which (9) has twice the area of the other (10). The smaller of the pistons linked together, one of which (9) has twice the area of the other (10). The smaller of the two outer chambers is connected to the fluid inlet and the larger outer chamber to the mid-point of the ER valve assembly; the space between the pistons is connected to the inlet. As long as the pressure drop in the two ER valves is the same, the forces on the piston cancel out, but energising each of the ER valves drives the piston assembly in opposite directions. This layout allows the actuator to be much more compact and also reduces the electrical control power; since the plates are stationary and rigidly fixed, it avoids the constructional difficulties of the design shown in FIG. 1A. However, it requires a great deal of inter-connecting pipework. If this is narrow, it increases the referred inertia; if it is wide, it makes the actuator very bulky and difficult to construct. In this actuator, and in that shown in FIG. 1A, there is tidal flow into and out of the piston assemblies so solid may settle out in these areas.

The Invention

Figure 1C:
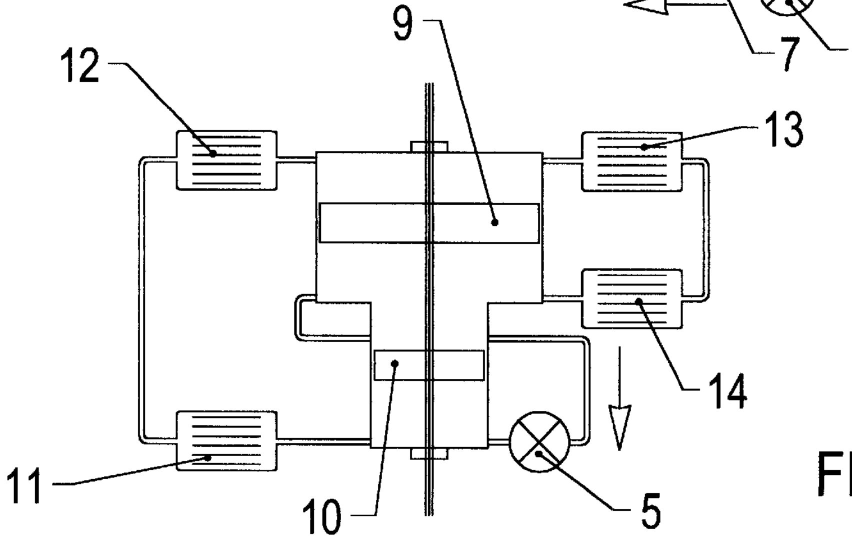
FIG. 1C shows an ER actuator designed according to one aspect of the present invention.

FIG. 1C shows an ER actuator designed according to one aspect of the present invention. Functionally, it is identical to that shown in FIG. 1B, but the ER valve (7) in the latter is now divided into two shorter ER valves, (11) and (12) connected in series, similarly, ER valve (8) in FIG. 1B is divided into the two ER valves (13) and (14). The configuration has also been changed to allow the connections to each chamber of the cylinder assembly to be diametrically opposite each other, giving uni-directional flow throughout. This arrangement has four main advantages:

a) The length of extraneous pipework can be reduced to an absolute minimum, simplifying construction and greatly reducing referred inertia. Since the flow through the pump is constant, connections to the latter do not contribute to the referred inertia.
b) Construction of the ER valves is simplified. As the length of an ER valve is increased, it becomes progressively more difficult to maintain the correct gap between the electrodes. Dividing the ER valve into two sub-units overcomes this difficulty.
c) As shown in the diagram, the new design makes it easy to arrange a through flow in each chamber of the piston assembly. The advantages of this have already been discussed.
d) The new layout minimises the amount of ER fluid exposed to the pressure and so reduces the effects of compressibility. Similarly, the compact form may allow the channels and ER valves to become holes or grooves machined in solid metal, reducing the effect of compliance.

It is not always necessary to sub-divide both ER valves, nor to have the two parts of a single valve the same length. The essential features of the invention are:

A. The use of two ER valves in series connected to an asymmetric piston arrangement functionally similar to that shown in FIGS. 1B and 1C.
B. Sub-dividing one or both of the ER valves in such a way as to minimise the length, and maximise the cross-sectional area, of the connections between the valves and the piston assembly.

EXAMPLES

Four outline designs are discussed below. These illustrate various ways in which the basic arrangement may be modified, but the invention is not limited to these specific forms. Most of the examples discussed below use flexible diaphragms in preference to sliding seals, since these have been found to be more reliable; however, the invention could readily be adapted to use pistons with sliding seals. Similarly, the detailed geometry can be varied, or tubular ER valves replaced by flat-plate designs or vice versa.

Example 1

Figure 2:
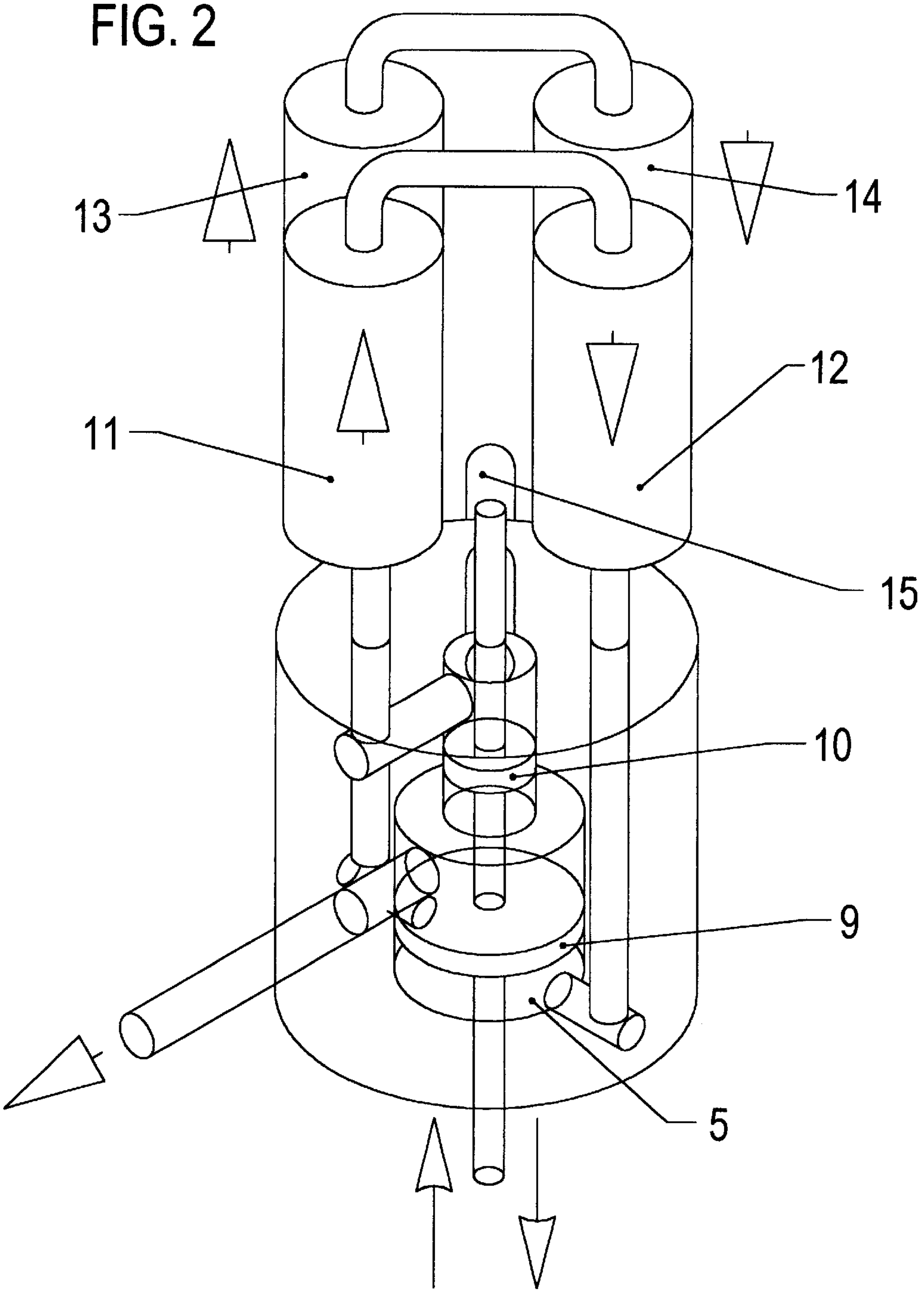
FIG. 2 shows one possible layout of an actuator made according to the invention.

FIG. 2 shows one possible layout of an actuator made according to the invention. The ER fluid from the pump enters through the inlet pipe (15) and passes over the smaller piston (10) on its way to the first ER valve (11) [N.B. The numbering of parts in this and the next Example, follows that of FIG. 1C as far as possible.] Having passed through this and the next ER valve (12), the ER fluid passes underneath the larger piston (9) and flows upwards into the second pair of ER valves, (13) and (14). Finally, it goes between the pistons (9) and (10) and emerges from the actuator via the outpipe at the bottom left of the diagram.

Sliding seals can cause problems when used with ER fluids, and it is desirable to replace them with diaphragms. If this done, the effective areas of the diaphragms replacing the pistons are reduced by the effective areas of the diaphragms replacing the piston seals, and this must be allowed for when calculating the relative areas. Using diaphragms, this actuator can be easily built up of heavy metal plates with holes and slots machined into them to give the various chambers and passages; the diaphragms are trapped between the plates when the latter are clamped together. The ER valves themselves can be axial holes in a metal cylinder with central rods forming the live electrodes. In this way, a very compact, robust and stiff device can be built up.

Example 2

Flat or dished diaphragms greatly reduce the permissible maximum stroke. Rolling diaphragms, which are widely used in pneumatic systems, overcome this problem; the resultant limitation on maximum working pressure, typically 20–25 Bar, is seldom serious in single ER actuators, since the ER valves required to control higher pressures are often inconveniently long. However, it is sometimes convenient to supply several ER actuators in series from a single pump, in order to minimise pipe runs, ensure that the flow is the same through each and to match the total requirement to the output of the pump. In this case, each actuator may be enclosed in a pressure proof housing which is completely filled with a suitable liquid, such as silicone oil. The mechanical output, which must be double-ended so that the total volume within the housing remains constant, can then be taken out through standard sliding oil seals. Since the latter are only exposed to the external liquid, they will behave normally. The pressure within the external housing can be controlled by a small flexible capsule, or a short section of thin-walled elastic tubing, in the return pipe from the actuator. This need only be small, since the volume changes will be very small if the housing is completely filled with liquid.

Figure 3A:
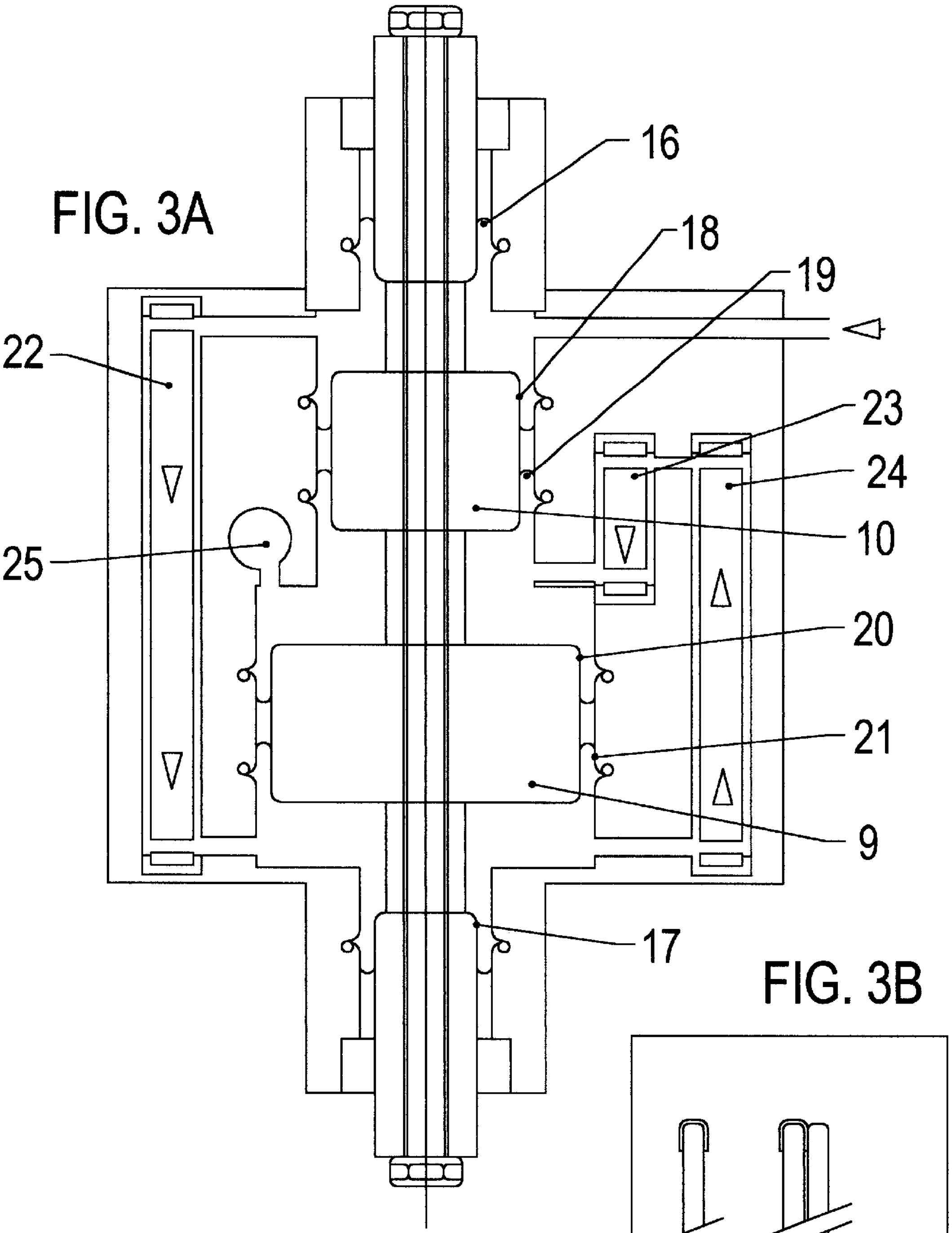
FIG. 3A shows a design which includes six rolling diaphragms.

ER fluid must not be allowed to come into contact with the reverse side of rolling diaphragms, since the particles are likely to agglomerate between the diaphragm and the metal walls. To avoid this, each "piston" seal can be made up from a pair of rolling diaphragms with an air-space between them. The constructional principles are illustrated in FIG. 3A. There are a total of six rolling diaphragms (16–21) of which two, (16) and (17), replace the piston rod seals. Two diaphragms, (18) and (19), seal the smaller piston (10) and the remaining pair, (20) and (21) seal the larger piston, (8). It will be apparent:

(A) That the since the pressure across rolling diaphragms must always be in the same direction, the external pipework must be arranged to keep the lowest pressure inside the actuator (i.e. at the outlet port) above ambient pressure.

(B) That the effective area of diaphragm (16) must be subtracted from those of (18) and (19) in calculating the effective area of the smaller piston (10). The same calculation must be carried out for the larger piston (9).

In FIG. 2 both the ER valves shown in FIG. 1B were divided into two equal parts. However, the modifications to accommodate the pairs of rolling diaphragms make the unit considerably longer, and this can be exploited in the geometry of the ER valves. In FIG. 3A, the ER fluid from the inlet flows across the small piston (10) and then down both sides of a plate (22) which forms the high voltage electrode for the first ER valve, which corresponds to (11) and (12) In FIG. 1C. This plate is electrically insulated from the rest of the device, and extends the full length. The ER fluid leaving this valve at "intermediate pressure" flows across the lower surface of the larger piston (9) and enters the second ER valve; this is sub-divided into sections corresponding to (13) and (14) of FIG. 1C, but in this case the sections are unequal. Each consists of an assembly similar to the first valve, with high voltage plates (23) and (24); the total effective length of the latter in the direction of flow is equal to that of (22). From there, the ER fluid flows across the space between the two pistons (9) and (10), and returns to the external circuit via the cross-hole (25).

Using rolling diaphragms in this way makes a compact and robust unit, but there are three practical disadvantages:

(i) There are large numbers of separate parts and the actuator is difficult to assemble, particularly since rolling diaphragms can easily be damaged by twisting.

(ii) Side loads on the piston rod may stretch the central draw-bolt sufficiently to allow the ER fluid to leak past the tubular spacers between the rolling diaphragms. This is particularly difficult to overcome in smaller units where there is little space for clamping.

(iii) Tooling costs make non-standard special sizes of rolling diaphragms prohibitively costly. However, the arrangement shown in FIG. 3A requires three sizes of rolling diaphragm whose effective areas must bear a definite relationship to each other. This severely restricts the range of actuators that can be made with standard components.

Figure 3B:
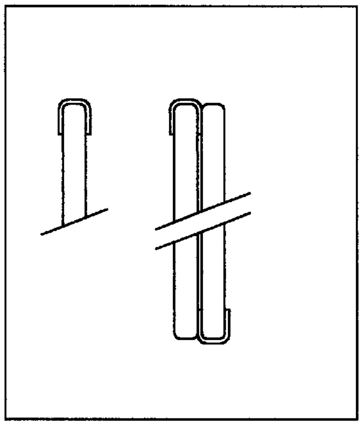
FIG. 3B shows a convenient way of constructing flat-plate ER valves.

FIG. 3B shows a convenient way of constructing flat-plate ER valves, such as those required in Example 2. The electrodes in such valves are usually made of thin, stiff metal plates with spacers between them. However, the most suitable material for spacers, poly-tetrafluoroethylene (PTFE) cannot be extruded into the desired sections and has very poor engineering properties:—it is flexible, "creeps" under load, and is very difficult to hold securely for machining. To overcome these problems, a strip of PTFE slightly thicker than the required spacer is bent around the edge of the electrode plates and bonded with a suitable adhesive—it may be necessary to etch the surface of the PTFE and hold the strip in a suitable jig while the adhesive hardens. The strip can then be finish-machined both sides to the required thickness, since it can be held by the metal plate—it is convenient if the latter is a magnetic material, such as gauge-plate steel. If the ER valve requires only a single plate, both edges of the electrode are treated in this way. Multi plate ER valves can be built up of a series of identical electrodes stacked as shown in the second diagram and clamped together within the housing. The exposed edges are insulated by a strip of PTFE running the full depth of the stack.

Example 3

To overcome the difficulties of Example 2, it is necessary to modify the basic arrangement shown in FIG. 1B. In this, the reference pressure is that in the middle chamber, connected to the inlet of the pump; ER fluid is thus in contact with both sides of both pistons, and this causes difficulties with rolling diaphragms. In the arrangement shown in FIG. 4, the inlet, intermediate and output pressures are all referenced to atmosphere, so that each piston, or rolling diaphragm has ER fluid on one side only, the other being exposed to the air.

The diagram shows a preferred form of the actuator in which there are four identical "pistons" and four identical ER valves. The ER fluid from the pump flows in through the port (15) and its pressure exerts a force on the first "piston" (26). It then flows through the annular gap between the housing, which is at earth potential, and a rod (27) which forms the first live electrode; this rod is fixed in an insulating bush (28). At the end of (27), the ER fluid flows through the cross-port (29) and enters the second ER valve, flowing between the live electrode (30) and the wall of the housing. The ER fluid then enters the second chamber, in which its pressure, now reduced by passage through the first two ER valves, exerts a force on two "pistons", (31) and (32) which are identical to (26). From this second chamber, the ER fluid enters the third ER valve, flowing over the live electrode (33), and through the second cross-port (34) into the final ER valve with live electrode (35). At the end of the final ER valve, the fluid enters the third chamber, where its pressure, now reduced by passage through all four ER valves, exerts a force on the final "piston" (36). The ER fluid returns to the pump though the exit port (37).

Each "piston" is attached to a short rod which slides in a suitable low-friction guide. The rods from the two "pistons" at the top and bottom of the device as drawn (i.e. (26) and (36) on the top and (31) and (32) on the bottom) are attached to cross-bars (38) and (39); these are joined in turn by a rod (40) which passes through the center of the device. This rod moves in a vertical tube (41) in the septum between the first and third chambers. This extends across the cross-hole in the housing forming the second and third ER valves and is pressed, or sealed with "O" rings, into the central housing at the bottom. Since the tube (41) is sealed to the housing top and bottom, there is no need for sliding seals.

This form of the device is very simple to construct and assemble, being made up of a central block and two guide blocks which nip the outer parts of the rolling diaphragms; the beads moulded on the edges of the rolling diaphragms act as "O" rings and prevent any leakage. Although this is the preferred form, the basic design can be modified in various ways. Multi-plate ER valves can replace the annular valves used in the example, or the ER valves can be made up as separate units. All these variations fall within the scope of the basic invention. A further advantage is that all four rolling diaphragms are the same size so that almost any unit can be made with standard, off-the-shelf components.

Example 4

Figure 4:
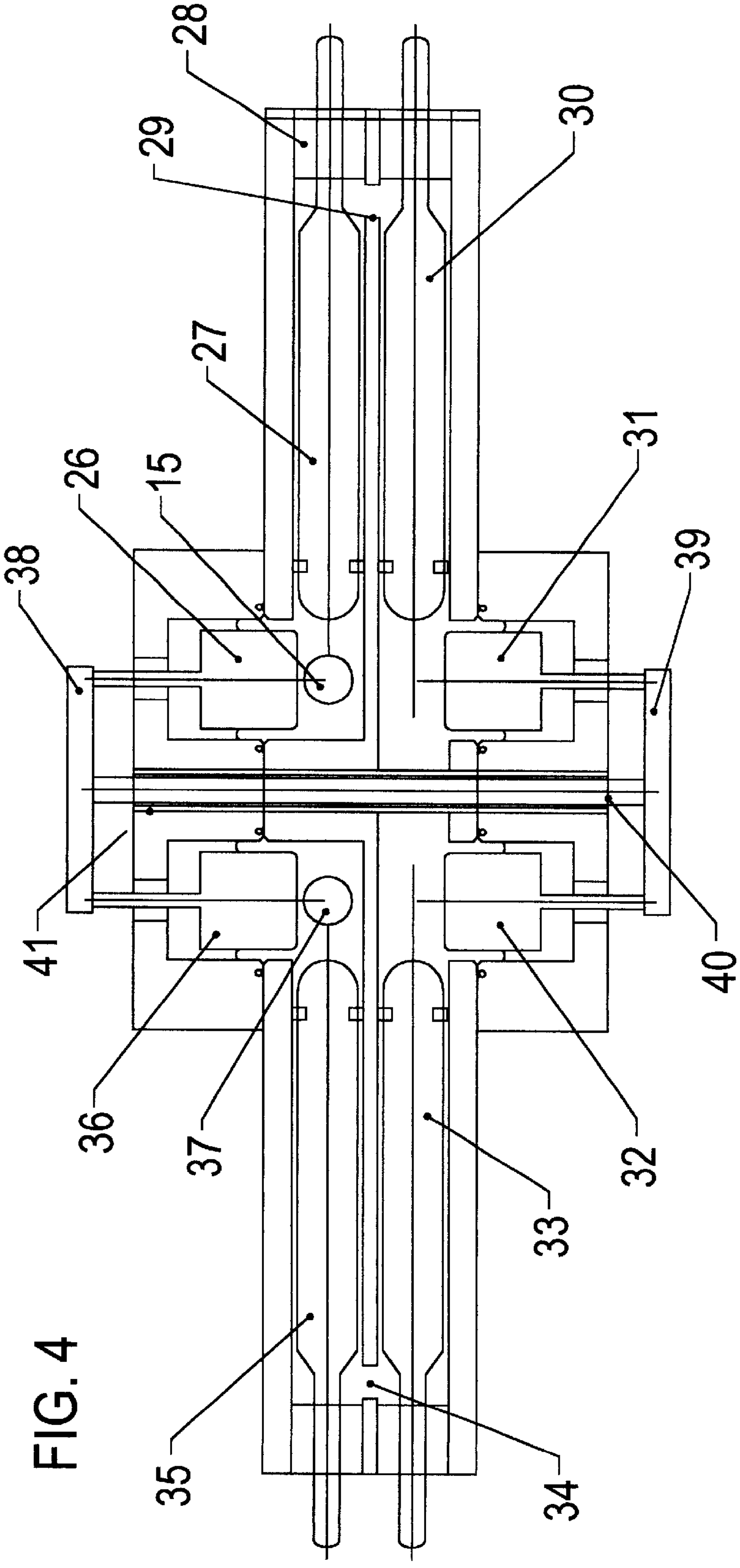
FIG. 4 shows an arrangement wherein the inlet, intermediate and output pressures are all referenced to atmosphere.
Figure 5:
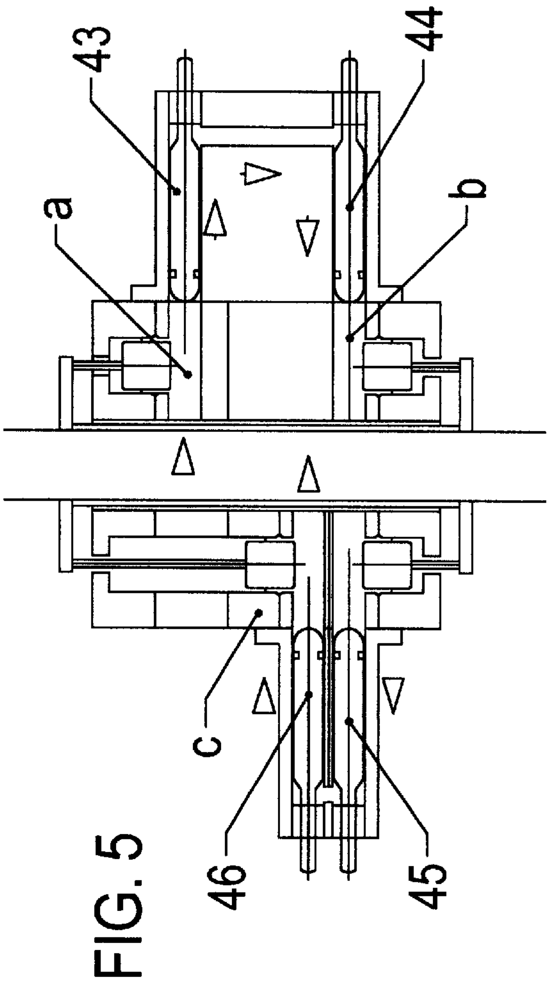
FIG. 5 shows one form of a layout wherein two equal pistons are located opposite each other on a pitch circle about the central rod.

The unequal forces on the two top pistons in Example 3 will apply a bending load to the central guide rod so that it must be fairly stiff. This can be avoided by dividing each of the four "pistons" in FIG. 4 into two equal pistons located opposite each other on a pitch circle about the central rod. FIG. 5 shows one form of the layout.

Figure 7C:
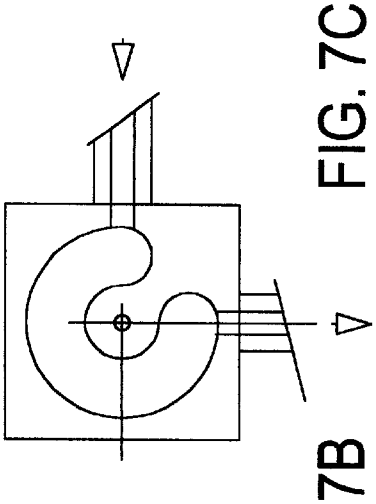
FIGS. 7A, 7B and 7C are partial cross-sections at right-angles illustrating the various plates of the layout shown in FIG. 5.
Figure 7B:
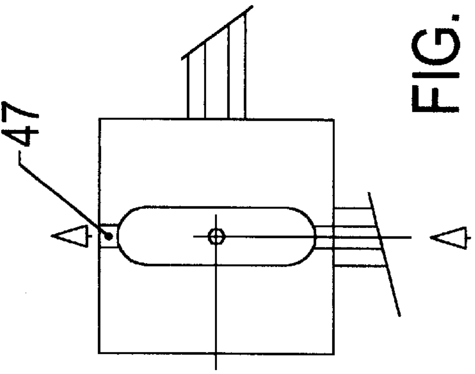
Figure 7A:
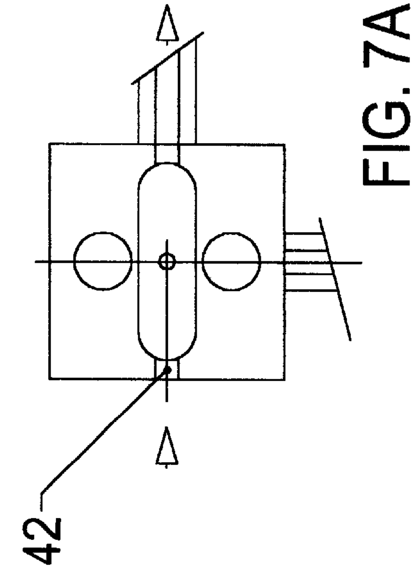

The actuator follows the general layout of Example 3 but there are four "pistons" top and bottom. and it is built up in a "sandwich" of machined plates as in Example 1. FIGS. 7A, 7B and 7C are partial cross-sections at right-angles illustrating the various plates shown in plan. The top and bottom guide blocks and the cross-bars are basically similar to those shown in FIG. 4 except that they have provision for four peripheral rods rather than two. In FIG. 4 the ER valves were machined directly into the central block, but this would be impractical in the present design and so there are two separate valve blocks sealed onto the main body. Ideally, the actuator would be machined from a casting, but this would only be economic if large numbers were to be made.

ER fluid enters through a port (42) drilled into the side of the upper plate (a). This has four holes in it corresponding to the four upper "pistons", but two of these are joined to form a chamber through which the ER fluid flows into the first ER valve (43). From here, the fluid flows down through a vertical port, into the second ER valve (44). It emerges from this valve into the bottom plate (b) which has a 270-degree channel communicating with all four of the lower "pistons" cut into it. Having flowed through this channel, the ER fluid enters a second valve block at right-angles to the first containing ER valves (45) and (46). The ER fluid flows from the latter across a second slot joining the recesses corresponding to the two remaining "pistons" in the third plate (c) and finally returns to the pump through the output port (47), which is at right-angles to the input port (42).

There are clearly many detailed variations possible within this basic scheme. As before, different forms of ER valve can be used, or different methods of construction. Since this design removes all bending loads from the central rod, the latter can be made thinner and lighter; since it is always under tension, there is no risk of buckling. For some purposes, it may be advantageous to replace the single central rod with several smaller ones between the pistons; this would reduce the bending loads on the top and bottom moving plates.

Figure 6:
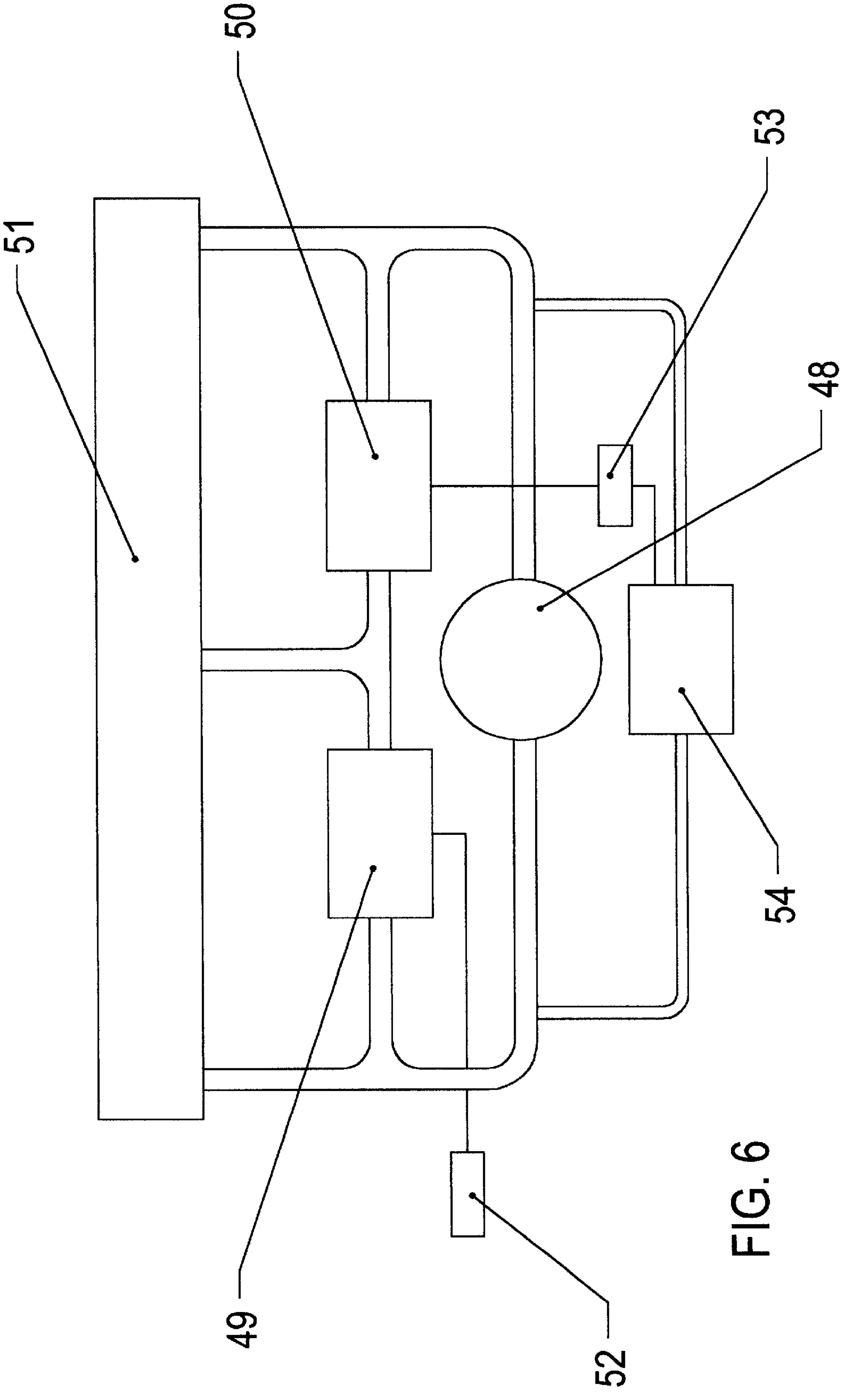
FIG. 6 shows an arrangement which compensates for any variation in the output of the pump and non-linearity in the response of the ER valves.

The high speed of response of ER valves makes it possible to modify the basic control strategy compared with a conventional hydraulic system. To obtain high speed of response from any actuator operated by flowing liquid it is essential to arrange that the flow in the external circuit does not change when the actuator operates, if this is not achieved, the referred inertia of the fluid in the external pipework will make the actuator very sluggish. Conventional hydraulic systems used two linked valves, so that one opens as the other closes. Similarly, in an ER actuator, the voltage on one ER valve, or valves, must be arranged to fall as the other increases. However, the high speed of response of an ER system allows a different strategy to be adopted. This is illustrated in FIG. 6. In this, the pump (48) drives ER fluid round a circuit containing two ER valves, (49) and (50) with pipes to the piston assembly (51). A voltage determined by the command signal from the input (52) is applied to only one of the ER valves. The second ER valve is controlled by an electronic feedback unit (53) which takes the signal from a differential pressure transducer (54) measuring the pressure across the entire assembly and feeds a voltage to the second ER valve to maintain this pressure at a constant pre-set level. This arrangement compensates for any variation in the output of the pump and non-linearity in the response of the ER valves. It also allows single-ended high voltage power supplies to be used which are simpler to construct than the linked units required in the conventional arrangement.

What is claimed is:

1. A pressure-operated linear actuator in which the working liquid is Electro-Rheological (ER) fluid in which there is a single flow path between an inlet and an outlet of an associated pump in which there are two or more pistons and fluid chambers delineated by these pistons, which fluid chambers are connected in series by stationary ER valves distinct from the said pistons such that the pressure as determined by each of the said ER valves is applied to one or more of said chamber(s), wherein one or both of the ER valves are divided into two or more sections in order to minimize the length, and maximize the cross-sectional area, of the inactive connecting passages.

2. A linear actuator, as in claim 1, in which there is uni-directional flow in all parts.

3. A linear actuator, as in claim 1, in which the pistons take the form of flexible rolling diaphragms.

4. A linear actuator, as in claim 3, in which some or all of the rolling diaphragms comprise two diaphragms with an air-space between them.

5. A linear actuator, as in claim 3, in which the actuator is surrounded by a pressure-proof housing filled with an incompressible liquid.

6. A linear actuator, as in claim 1, in which one of the ER valves is controlled in response to the pressure difference across the entire actuator and so arranged as to keep this pressure constant.

* * * * *